United States Patent
Cui et al.

(10) Patent No.: US 10,087,808 B2
(45) Date of Patent: Oct. 2, 2018

(54) EXHAUST SYSTEM WITH TAILORED WALL THICKNESS

(75) Inventors: Hongjiang Cui, Meitingen (DE); Erich Weigele, Augsburg (DE)

(73) Assignee: EMCON TECHNOLOGIES GERMANY (AUGSBURG) GMBH (DE)

( * ) Notice: Subject to any disclaimer, the term of this patent is extended or adjusted under 35 U.S.C. 154(b) by 1409 days.

(21) Appl. No.: 12/667,739

(22) PCT Filed: Jul. 9, 2008

(86) PCT No.: PCT/EP2008/005592
§ 371 (c)(1),
(2), (4) Date: Aug. 3, 2010

(87) PCT Pub. No.: WO2009/007099
PCT Pub. Date: Jan. 15, 2009

(65) Prior Publication Data
US 2010/0288391 A1  Nov. 18, 2010

(30) Foreign Application Priority Data

Jul. 11, 2007 (DE) .......... 10 2007 032 267

(51) Int. Cl.
*F16L 13/08* (2006.01)
*F01N 3/28* (2006.01)
*F01N 13/18* (2010.01)

(52) U.S. Cl.
CPC ....... *F01N 3/2842* (2013.01); *F01N 13/1805* (2013.01); *F01N 13/1838* (2013.01); *F16L 13/08* (2013.01); *F01N 2450/22* (2013.01)

(58) Field of Classification Search
CPC ...................................... F16L 13/08
USPC .......... 285/289.1–289.5, 288.1, 288.5, 288.6
See application file for complete search history.

(56) References Cited

U.S. PATENT DOCUMENTS

| 80,126 | A | * | 7/1868 | Bradford | 248/62 |
|---|---|---|---|---|---|
| 1,985,733 | A | * | 12/1934 | Koester | 428/486 |
| 2,157,918 | A | * | 5/1939 | Rankin | 285/192 |
| 2,730,116 | A | * | 1/1956 | Richard | 137/217 |
| 3,687,495 | A | * | 8/1972 | Sakamoto et al. | 285/356 |
| 4,607,722 | A | * | 8/1986 | Tanaka et al. | 181/252 |
| 5,145,215 | A | * | 9/1992 | Udell | 285/49 |
| 5,372,390 | A | * | 12/1994 | Conway et al. | 285/136.1 |
| 5,625,256 | A | * | 4/1997 | Tiedt et al. | 313/636 |

(Continued)

FOREIGN PATENT DOCUMENTS

| CN | 2125715 U | 12/1992 |
|---|---|---|
| CN | 2509413 Y | 9/2002 |

(Continued)

OTHER PUBLICATIONS

English Translation (the description portion) for WO 2005/098,893, [online], retrieved on Apr. 19, 2016, from URL:<http://worldwide.espacenet.com/publicationDetails/description?CC=WO&NR=2005098893A1&KC=A1&FT=D&ND=3&date=20051020&DB=EPODOC&locale=en_EP>.*

(Continued)

*Primary Examiner* — David Bochna
*Assistant Examiner* — James A Linford
(74) *Attorney, Agent, or Firm* — Carlson, Gaskey & Olds, P.C.

(57) ABSTRACT

A tube for an exhaust system includes an add-on part that is firmly connected with the tube by a brazing seam.

35 Claims, 2 Drawing Sheets

(56) References Cited

U.S. PATENT DOCUMENTS

| | | | |
|---|---|---|---|
| 5,813,438 A * | 9/1998 | Reed | 138/121 |
| 6,415,603 B1 * | 7/2002 | Nowka et al. | 60/322 |
| 6,669,912 B1 * | 12/2003 | Udell | 422/179 |
| 2003/0020279 A1 * | 1/2003 | Houtschilt et al. | 285/420 |
| 2003/0102666 A1 * | 6/2003 | Huber | 285/288.1 |
| 2004/0013581 A1 | 1/2004 | Burnette | |
| 2006/0261594 A1 | 11/2006 | Gerard | |
| 2007/0211862 A1 * | 9/2007 | Ito et al. | 378/140 |
| 2009/0261574 A1 | 10/2009 | Blueml | |

FOREIGN PATENT DOCUMENTS

| | | |
|---|---|---|
| CN | 2784591 Y | 5/2006 |
| DE | 19508217 | 9/1996 |
| EP | 1329603 | 7/2003 |
| GB | 2313581 A | 6/1998 |
| WO | 03074925 | 9/2003 |
| WO | WO 2005/098893 A1 * | 10/2005 |
| WO | 2006015666 A1 | 2/2006 |

OTHER PUBLICATIONS

English Translation of International Preliminary Report on Patentability, dated Feb. 18, 2010.
International Search Report, dated Sep. 23, 2008.
Pu Yongfeng, Liang Yaoneng, "Materials for Mechanical Engineering", Beijing: Tsinghua University Press; Sep. 2005 p. 274-276 with English Translation.
"The Application of Advanced Blazing Technology Techniques to Space Vehicles", Aerospace Research Institute of Materials and Processing Technology; 2000 V.3 P.11 with English Translation.

\* cited by examiner

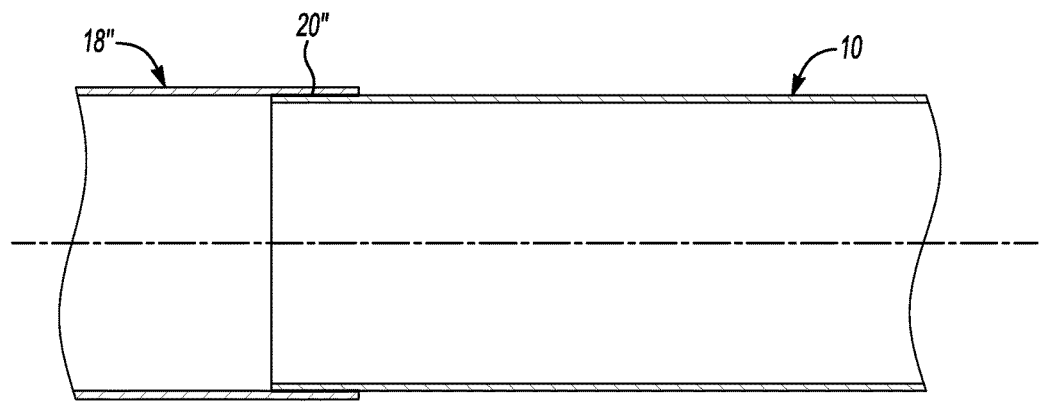
Fig-4
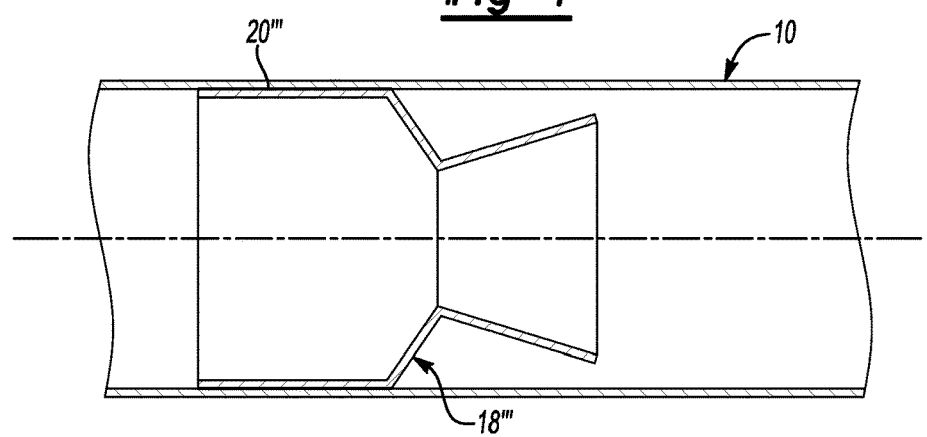
Fig-5
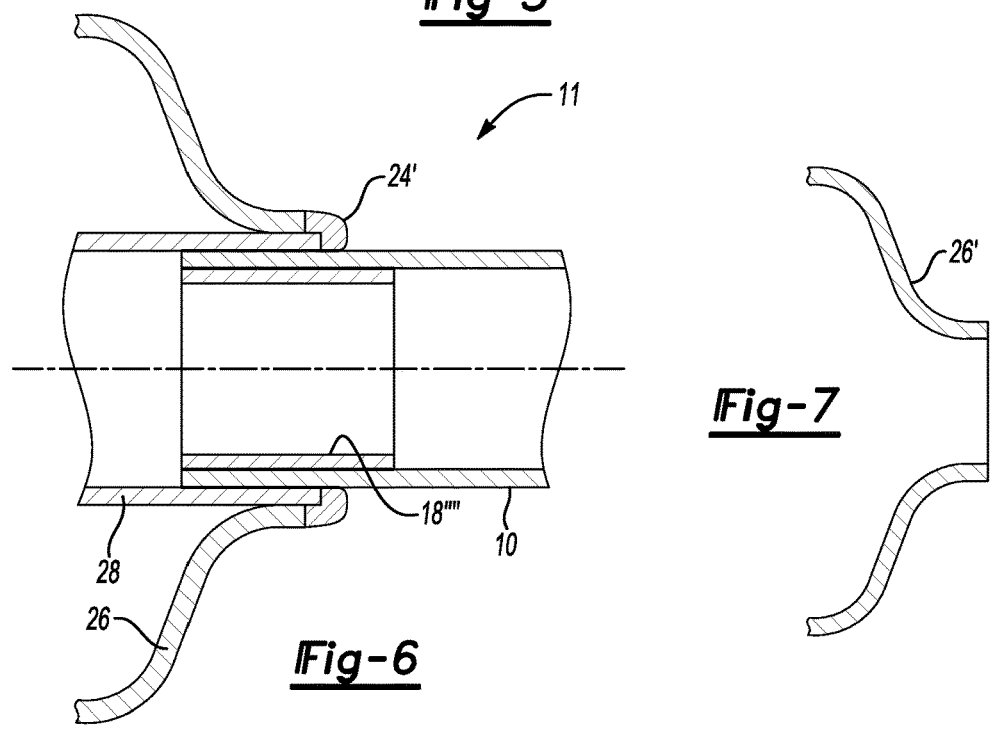
Fig-6
Fig-7

US 10,087,808 B2

EXHAUST SYSTEM WITH TAILORED WALL THICKNESS

RELATED APPLICATION

This application is the U.S. national phase of PCT/EP2008/005592, filed Jul. 9, 2008, which claimed priority to German Application No. 10 2007 032 267.6, filed Jul. 7, 2007.

BACKGROUND OF THE INVENTION

The invention relates to a tube for an exhaust system.

In motor vehicles, efforts are made to realize all components with a weight that is as low as possible. In this way, it is possible to save fuel during operation of the motor vehicle. One approach for weight optimization in exhaust systems consists in using tubes with tailored wall thicknesses, which are referred to as "tailored tubes." The term "tailored wall thickness" means that in each point of the tube, the wall thickness is adapted to the stresses prevailing there. For example, in regions subject to a high mechanical stress, a wall thickness is used which is larger than in other regions subject to less stress.

Up to now, significant efforts are necessary to adapt the wall thicknesses of the tube to the respective stresses because it is very difficult to make changes in the wall thickness in the exhaust system tubes, which are usually drawn. For this reason, the wall thickness of the exhaust system tubes is mostly determined on the basis of the maximum stress acting in the respective portion, for example, to obtain the fatigue limit in a portion highly stressed by vibrations, or to ensure the process safety during welding, in case weld seams are to be provided. In particular, weld seams lead to the use of tubes having an excessively large wall thickness in exhaust systems. To be able to produce a weld seam with the usual accuracy in a process-safe manner, such as for a metal active gas (MAG) welding process which is typically used to save costs, wall thicknesses in the range of 1.0 mm to 1.5 mm are presently used. However, in view of the mechanical stability of the tube, a wall thickness of 0.8 mm would be sufficient over large parts. It can be seen here, that a considerable saving of weight could be realized by a tube having an appropriate tailored wall thickness.

Tests were performed to produce a tailored wall thickness by a local compression of a tube. However, it has been found that this method is not sufficiently process-safe for thin tubes.

The object of the invention thus consists in the provision of a tube for an exhaust system which can be produced with low expenditure to have an appropriate tailored wall thickness.

SUMMARY OF THE INVENTION

A tube for an exhaust system includes an add-on part which is firmly connected with the tube by a brazing seam. By using a brazing seam, the add-on part, i.e. a reinforcing part extending over a short length, can be fastened to the tube in a process-safe manner. This takes advantage of the finding that brazing is an extremely process-safe method.

The add-on part can be a short tube part, a sleeve, or even a functional part. In this way, the appropriate wall thickness can be produced locally, which is necessary in view of the stresses acting there.

The add-on part can be arranged within or outside the tube without affecting the strength.

According to a preferred embodiment, it is provided that a third part is mounted in the region of the add-on part. The third part can be a fastening tab or a fastening eye which is used to mount the exhaust system to the motor vehicle. The third part can particularly be welded thereon. In fact, it has been found that a tube that is locally provided with an increased wall thickness due to the add-on part, and which more specifically has a double layer structure, behaves during welding like a tube having an originally high wall thickness. A tube having a wall thickness of 0.8 mm, for example, which is provided with an add-on part which also has a wall thickness of 0.8 mm, behaves in the region of the add-on part like a tube having a wall thickness of 1.6 mm. The third part can easily be welded to this tube, although the actual tube and also the add-on part each have a wall thickness which actually does not allow a welding. It is not important, either, that the energy supplied for welding the third part leads to a partial melting of the brazing material between the tube and the add-on part. It has been found in tests, that the quality of the brazing seam is not affected by a multiple repeated melting, either.

The third part may also be a housing of a muffler or of a catalytic converter. It can also be fastened in case of thin wall thicknesses of the exhaust tube, for example using laser welding.

Advantageous embodiments of the invention will become apparent from the dependent claims.

These and other features of the present invention can be best understood from the following specification and drawings, the following of which is a brief description.

BRIEF DESCRIPTION OF THE DRAWINGS

The invention is described below with reference to various embodiments illustrated in the accompanying drawings which show:

FIG. 4 is a third example of a tube according to the invention;

FIG. 5 is a fourth example of a tube according to the invention; and

FIG. 6 is a fifth example of a tube according to the invention.

FIG. 7 shows another example according to the invention.

DETAILED DESCRIPTION OF THE PREFERRED EMBODIMENT

Figure 1:
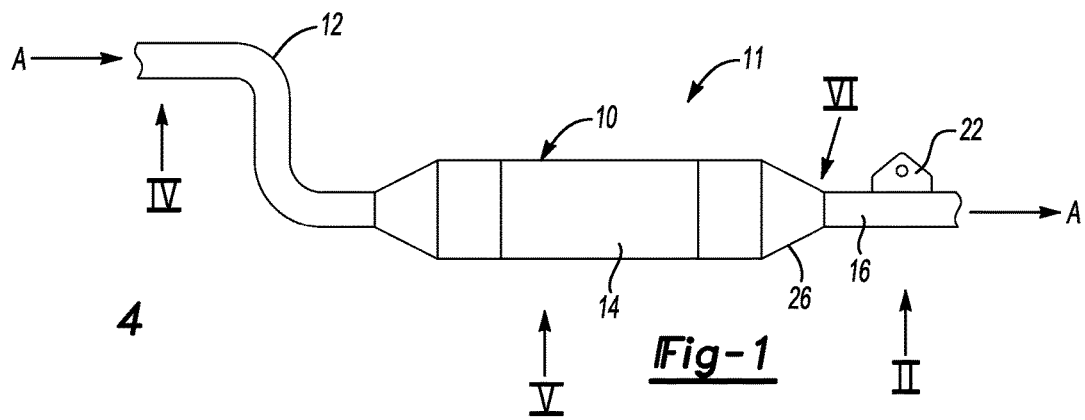
FIG. 1 is a schematic view of part of an exhaust system.

FIG. 1 generally shows a tube 10 for a motor vehicle exhaust system 11 for exhaust gases A. In this example, the tube 10 includes a first portion 12, a second portion 14, and a third portion 16. The first and third portions 12 and 16 are in particular realized to have a wall thickness which is considerably smaller than the current usual wall thickness of exhaust system tubes. An example wall thickness is on the order of 0.8 mm.

Figure 2:
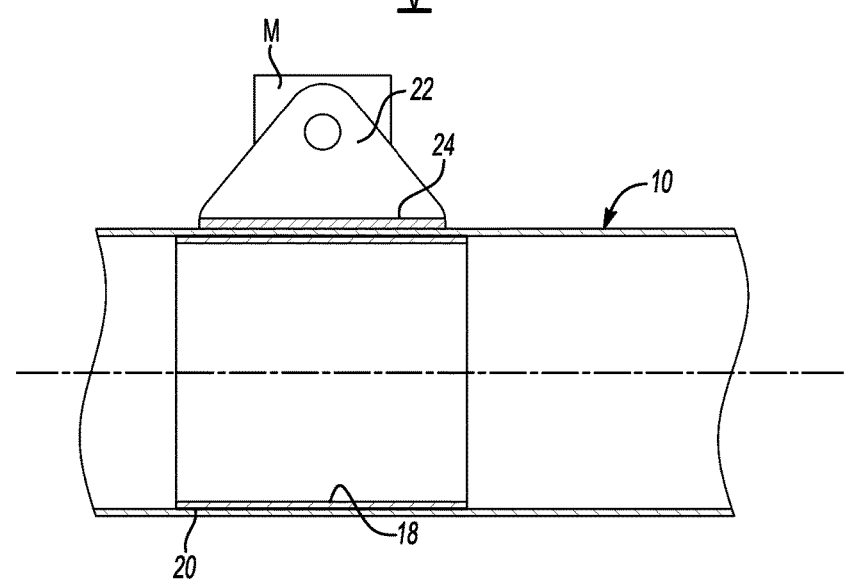
FIG. 2 is a first example of a tube according to the invention.

This wall thickness is not sufficient to permit the fixation of a fastening tab or of a fastening eye. To obtain locally a tailored wall thickness, an add-on part 18 is provided (see FIG. 2) which is configured as a sleeve arranged in an interior of the tube 10, in the region II of FIG. 1, for example. A brazing seam 20 is present between the add-on part 18 and the tube 10, which is formed by a high-temperature brazing metal. This brazing seam can be produced by induction brazing, by brazing in a continuous furnace, or by chamber brazing, using, if necessary, a protective gas and fluxing agents. The wall thickness of the add-on part 18 is on the order of 0.8 mm so that a wall thickness of 1.6 mm is obtained locally. This permits the fastening of a third part in the form of a fastening eye 22, which is welded to the tube 10 (see weld seam 24). The fastening eye 22 is used to mount the exhaust system to the motor vehicle M (FIG. 2). Due to the locally increased wall thickness, irrespective of the fact, that it has a double layer structure there, the tube 10 behaves like a tube having a wall thickness of 1.6 mm during welding.

The particular advantage resulting when the add-on part is brazed consists in that in contrast to a weld seam, the brazing seam leads to a "soft" cross-sectional jump. For this reason very good fatigue limit values are obtained for the tube having an add-on part 18 brazed therein.

Figure 3:
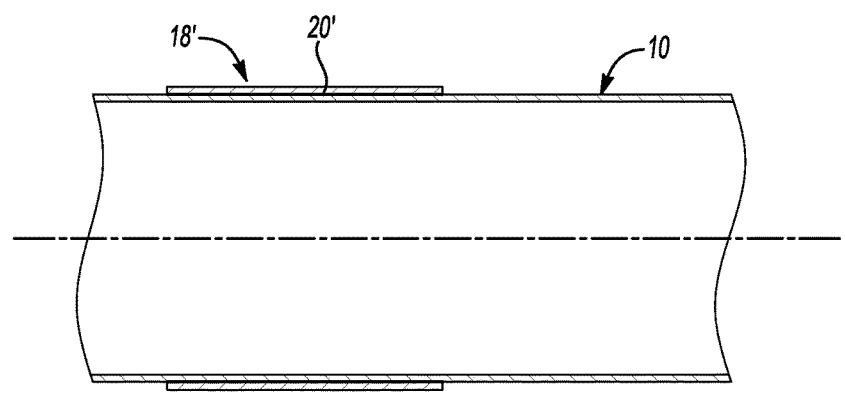
FIG. 3 is a second example of a tube according to the invention.

FIG. 3 shows an alternative to the embodiment shown in FIG. 2. The difference is that here, the add-on part 18' is not inserted into the interior of the tube 10 but is placed on an outer surface of the tube 10. The add-on part 18' is then brazed at brazing seam 20' to the tube 10 so that a tailored wall thickness adapted to the respective requirements is obtained locally. This is particularly advantageous if the add-on part 18' is not to be arranged at the end of the tube 10 but further in the interior. In this case, an external add-on part can be fixed more easily.

It is not absolutely necessary to configure the add-on part 18 as a circumferentially closed tube. The add-on part 18 can be configured as a bent sheet metal blank, for example. In this way, the add-on part 18 can be fastened behind an arc, for example.

FIG. 4 shows an example embodiment which can be used in the region IV of FIG. 1, for example. An add-on part 18" in the form of a short tube is brazed at brazing seam 20" onto the tube 10, which has a larger wall thickness than the tube 10. In this way, strength values are obtained in the region of the short tube which are higher than those for the region of the tube 10.

It is also particularly advantageous in this embodiment that the brazing seam 20" constitutes a soft cross-sectional transition in fatigue limit tests rather than a hard cross-sectional jump as would be the case for a weld seam. Therefore, the brazing seam 20" does not lead to an impairment of the fatigue limit.

FIG. 5 shows an example embodiment as can be used in the region V of FIG. 1. In this case, the add-on part 18''' is realized as a functional part, more specifically as a nozzle within the tube 10. This add-on part can be positioned at the desired place within the tube 10 and brazed therein at brazing seam 20''' with low expenditure.

FIG. 6 shows an example embodiment in which as a third part, a housing of a muffler 26 can be connected with the exhaust tube 10, for example in the region VI of FIG. 1. The inner surface of the exhaust tube 10, similar to the embodiment of FIG. 2, is reinforced by the add-on part 18"". This permits welding of the housing of the muffler 26 to the tube 10, for example using laser welding, at weld 24'. At the same time, an inner hole 28 of the muffler 26, which is arranged within the housing, can be connected with the housing of the muffler 26 thereof and with the tube 10.

The housing of the muffler 26 can of course be a functional part or a component of the motor vehicle exhaust system 11 which differs from a muffler 26, such as a catalytic converter or a filter 26' shown schematically in FIG. 7 as a replacement of muffler 26 in FIG. 6, for example.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A tube for an exhaust system, including:
   an exhaust tube defining a longitudinal axis;
   an add-on part which is connected with the exhaust tube by a brazing seam; and
   a fastening element arranged in a region of the add-on part such that the fastening element and add-on part have an axial overlap, and wherein the fastening element is fixed to the exhaust tube or the add-on part with a weld seam, the weld seam being arranged within the axial overlap.

2. The tube according to claim 1, wherein the add-on part is a tube part that is shorter than the exhaust tube.

3. The tube according to claim 1, wherein the add-on part is a sleeve.

4. The tube according to claim 1, wherein the add-on part is a functional component that directs exhaust gas within the exhaust tube.

5. The tube according to claim 1, wherein the add-on part is arranged within the exhaust tube.

6. The tube according to claim 1, wherein the add-on part is arranged outside the exhaust tube.

7. The tube according to claim 1, wherein an end face of the add-on part is arranged to be flush with an end face of the exhaust tube.

8. The tube according to claim 1, wherein a wall thickness of the exhaust tube is within a range of 0.6 to 0.8 mm.

9. The tube according to claim 1, wherein the brazing seam comprises a brazing metal.

10. The tube according to claim 9, wherein the brazing seam is produced by induction brazing.

11. The tube according to claim 1, wherein the region of the add-on part comprises an overlapping region between the fastening element and add-on part, and wherein the fastening element comprises a fastening eye that is configured to mount the exhaust tube to a motor vehicle.

12. The tube according to claim 1, wherein the exhaust tube forms a portion of a motor vehicle exhaust system through which exhaust gases are discharged.

13. The tube according to claim 1, wherein the region of the add-on part comprises an overlapping region between the fastening element and add-on part to define the axial overlap, and wherein the exhaust tube has an open first end and an open second end to form a motor vehicle exhaust gas passage therethrough to conduct heated exhaust gases from an upstream exhaust component at the first end to a downstream exhaust component at the second end.

14. The tube according to claim 1, wherein the add-on part is in direct contact with the exhaust tube and wherein the fastening element is in direct contact with at least one of the exhaust tube or add-on part.

15. A tube for an exhaust system, including:
    an exhaust tube; and
    an add-on part which is connected with the exhaust tube by a brazing seam, wherein a wall thickness of the add-on part is within a range of 0.2 to 0.8 mm, and wherein a wall thickness of the exhaust tube is within a range of 0.6 to 0.8 mm.

16. The tube according to claim 15, wherein the exhaust tube defines a center axis, and including an additional part positioned in a region of the add-on part, the region of the add-on part comprising an overlapping region between the additional part and add-on part, wherein the additional part comprises one of a housing for a muffler or a housing for a catalytic converter that is located radially outward of and surrounds the exhaust tube.

17. The tube according to claim 16, including an inner tube located radially outward of the exhaust tube and radially inward of the housing.

18. The tube according to claim 17, including a weld seam connecting the inner tube, the housing, and the exhaust tube together.

19. The tube according to claim 15, wherein the exhaust tube forms a portion of a motor vehicle exhaust system through which exhaust gases are discharged.

20. The tube according to claim 15, wherein the exhaust tube has an open first end and an open second end to form a motor vehicle exhaust gas passage therethrough to conduct heated exhaust gases from an upstream exhaust component at the first end to a downstream exhaust component at the second end.

21. The tube according to claim 15, wherein the exhaust tube defines a center axis, and including an additional part positioned in a region of the add-on part, the region of the add-on part comprising an overlapping region between the additional part and add-on part, and wherein the additional part comprises a fastening element located radially outward of the exhaust tube and that is configured to mount the exhaust tube to a motor vehicle.

22. The tube according to claim 15, including a third part positioned to overlap the add-on part, and wherein the add-on part is in direct contact with the exhaust tube and wherein the third part is in direct contact with at least one of the exhaust tube or add-on part.

23. A tube for an exhaust system comprising:
a first part comprising an exhaust tube body having a wall thickness within a range of 0.6 to 0.8 mm; and
a second part comprising an add-on part that is attached to the exhaust tube body with a brazing seam, and wherein a wall thickness of the add-on part is within a range of 0.2-0.8 mm.

24. The tube according to claim 23, including a third part positioned in a region of the add-on part, the region of the add-on part comprising an overlapping region between the third part and add-on part, and wherein the add-on part is in direct contact with the exhaust tube body and wherein the third part is in direct contact with at least one of the exhaust tube body or add-on part.

25. The tube according to claim 24, wherein the add-on part comprises a nozzle.

26. The tube according to claim 25, wherein the nozzle comprises a tube having a first portion with a first diameter and a second portion with a second diameter that is less than the first diameter.

27. The tube according to claim 24, wherein the exhaust tube body defines a center axis, and wherein the third part comprises a fastening element located radially outward of the exhaust tube body, and wherein the fastening element is configured to mount the exhaust tube body to a motor vehicle.

28. The tube according to claim 24, wherein the exhaust tube body defines a center axis, and wherein the third part comprises one of a housing for a muffler or a housing for a catalytic converter that is located radially outward of and surrounds the exhaust tube body.

29. The tube according to claim 28, including an inner tube located radially outward of the exhaust tube body and radially inward of the housing.

30. The tube according to claim 29, including a weld seam connecting the inner tube, the housing, and the exhaust tube body together.

31. The tube according to claim 23, wherein the exhaust tube body forms a portion of a motor vehicle exhaust system through which exhaust gases are discharged.

32. The tube according to claim 23, wherein the exhaust tube body has an open first end and an open second end to form a motor vehicle exhaust gas passage therethrough to conduct heated exhaust gases from an upstream exhaust component at the first end to a downstream exhaust component at the second end.

33. A tube for an exhaust system, including:
an exhaust tube wherein the exhaust tube forms a portion of a motor vehicle exhaust system through which exhaust gases are discharged; and
an add-on part which is connected with the exhaust tube by a brazing seam, wherein the add-on part is a nozzle.

34. A tube for an exhaust system, including:
an exhaust tube wherein the exhaust tube has an open first end and an open second end to form a motor vehicle exhaust gas passage therethrough to conduct heated exhaust gases from an upstream exhaust component at the first end to a downstream exhaust component at the second end; and
an add-on part which is connected with the exhaust tube by a brazing seam, wherein the add-on part is a nozzle.

35. A tube for an exhaust system, including:
an exhaust tube; and
an add-on part which is connected with the exhaust tube by a brazing seam, wherein the add-on part is a nozzle and wherein the nozzle is in direct contact with the exhaust tube.

* * * * *